United States Patent [19]
Nagano

[11] Patent Number: 4,594,787
[45] Date of Patent: Jun. 17, 1986

[54] IMPROVED BICYCLE FORK END ADJUSTER

[75] Inventor: Masashi Nagano, Izumi, Japan

[73] Assignee: Shimano Industrial Company Limited, Osaka, Japan

[21] Appl. No.: 784,893

[22] Filed: Oct. 7, 1985

[30] Foreign Application Priority Data

Oct. 17, 1984 [JP] Japan .................................. 59-157583

[51] Int. Cl.⁴ ................................................ G01B 5/14
[52] U.S. Cl. .............................. 33/180 AT; 33/203.19
[58] Field of Search ................ 33/203, 203.18, 203.19, 33/203.2, 203.21, 180 AT, 181 AT, 185 V, 533

[56] References Cited
U.S. PATENT DOCUMENTS 1,822,599  9/1931  Monk ............................ 33/180 AT
4,432,144  2/1984  Carlsson ...................... 33/180 AT Primary Examiner—Harry N. Haroian
Attorney, Agent, or Firm—Stevens, Davis, Miller & Mosher

[57] ABSTRACT

A bicycle fork end fixed to the rear of the bicycle frame adapted to mount a derailleur, thereon is adjusted by a device including an operating member mounted on the fork end portion where the derailleur is mounted and a reference member which is mounted on a member, such as a rear hub, installed on the fork end and is adjusted to be parallel with respect to the longitudinal center line of the bicycle frame. Thus, both the operating member and the reference member are used to measure the parallelism of the derailleur mounting portion at the fork end with respect to the longitudinal center line of the bicycle frame and to adjust the parallelism by operating the operating member on the basis of its measured position relative to the reference member.

4 Claims, 6 Drawing Figures

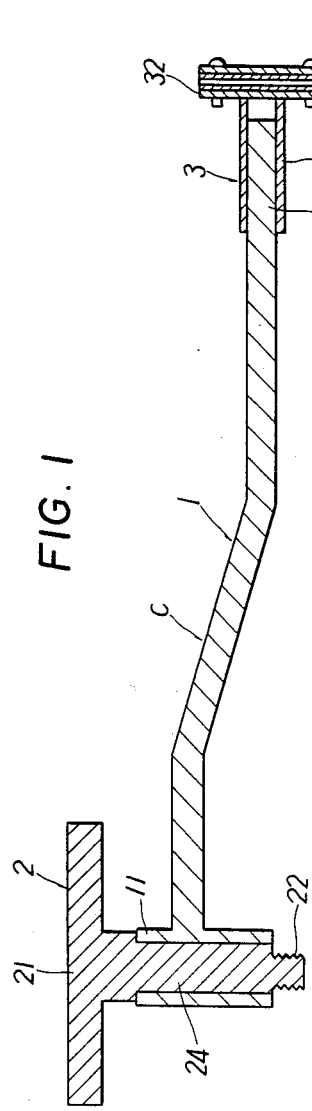
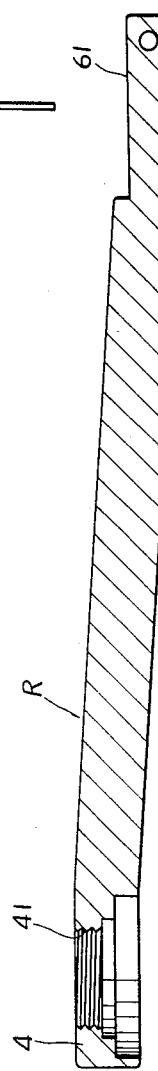
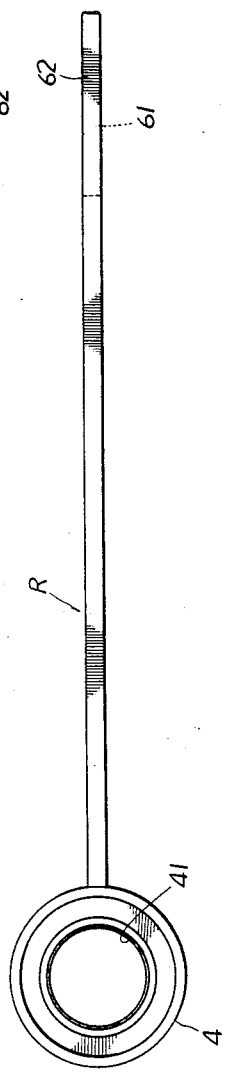
FIG. 1
FIG. 2
FIG. 3

IMPROVED BICYCLE FORK END ADJUSTER

FIELD OF THE INVENTION

This invention relates to an adjuster for a bicycle fork end, and more particularly to an adjuster for adjusting the fork end to be parallel with respect to the longitudinal center line of the bicycle frame, the fork end having a support groove for supporting a rear hub and a threaded bore for mounting therethrough a rear derailleur on the fork end, with the adjusted being fixed to the rear portions of back forks and chain stays of the bicycle.

BACKGROUND OF THE INVENTION

Generally, bicycle frames comprise a head pipe, a top tube, a down tube, a seat tube, a pair of back forks, and a pair of chain stay. Each back fork and each chain stay include respective fork ends at their rear portions, so that the rear hub is mounted across the fork ends. When a multistage speed change sprocket assembly is mounted on the rear hub, a derailleur for shifting a driving chain back and forth to desired ones of the sprockets is mounted on one fork end.

When the derailleur mounting portion at the fork end is not properly parallel with respect to the longitudinal center line of the bicycle frame, with which the rear hub is properly mounted, the positional relation between the chain guide at the derailleur and the sprocket is out of alignment, so that even when the derailleur operates properly, the speed change efficiency will deteriorate markedly.

Therefore, the parallel relationship between the longitudinal center line and the surface of the derailleur mounting portion should be strictly maintained. In order to check whether this parallel relationship exists, an adjuster is used which is provided with a threaded body screwable with a threaded bore at the derailleur mounting portion and an operating lever supported rotatably to the threaded body. The adjuster is screwably mounted on the derailleur mounting portion and a rim of a rear wheel is utilized to measure an interval between the side surface of the rim and the operating lever. When the measured degree of parallelism exceeds an allowable limit of error, a user grips the bicycle frame near the measured portion with one hand and the operating lever with his other hand and turns the lever toward or away from the rim, thereby adjusting the parallelism of the derailleur mounting portion with respect to the longitudinal center line of the bicycle frame.

The above-described adjuster for the fork end, however, cannot measure the aforesaid interval with accuracy because the rim is slanted at the side surface thereof with respect to the center line of the frame. As a result, the measured value of the interval is only a rough measurement, thereby creating a problem in that the fork end cannot be adjusted with high accuracy.

SUMMARY OF THE INVENTION

An object of the invention is to provide an adjuster which can measure with accuracy the parallelism of a bicycle fork end with respect to the longitudinal center line of the bicycle frame and can adjust the fork end with ease.

In detail, the invention is based on the observation that an installed member, such as the rear hub, having threaded portions, when mounted on threaded support grooves at the fork ends, can be adjusted with respect to its mounting condition so as to enable the threaded portions thereof to be kept parallel to the longitudinal center line of the frame. Accordingly, a reference member screwable with one threaded portion of the rear hub is used and a reference surface exactly parallel with respect to the longitudinal center line of the frame is provided at the reference member. Also, an adjuster is used which is screwable with a threaded bore through which the derailleur is mounted on the fork end. The reference member and the adjuster are used to accurately measure the parallelism of the derailleur mounting portion with respect to the longitudinal center line of the bicycle frame. Also, this parrallelism can be adjusted with ease by use of the reference member.

The adjuster of the invention is used for one fork end which has a support groove for supporting therein the rear hub and a threaded bore for mounting therethrough the derailleur on the fork end. The adjuster is fixed to the rear portions of a pair of back forks and a pair of chain stays. The adjuster comprises (1) an adjusting member provided with a threaded body screwable with the threaded bore at the fork end and an elongate operating lever having at its root a support cylinder supported rotatably to the aforesaid threaded body and at its foremost end a measuring portion; (2) a reference member which has a mounting portion having a threaded bore screwable with a threaded portion provided at an installed member, such as the rear hub of the bicycle, mounted on a support groove at each fork end; the reference member extends substantially perpendicularly to the axis of the threaded bore of the mounting portion and has at its foremost end in its extending direction a reference surface opposite to the measuring portion of the operating member; the reference surface is parallel with respect to the longitudinal center line of the bicycle frame including the back forks and chain stays when the mounting portion is screwably mounted on the threaded portion at the installed member; and (3) an interval measuring instrument for measuring an interval between the measuring portion of the operating member and the reference surface.

Thus, the adjuster of the invention is so constructed that the operating member is mounted on the derailleur mounting portion at the fork end, and the reference member is mounted preferably on the rear hub at the threaded portion thereof which is screwable with the sprockets, whereby the interval between the operating member and the reference member is measured to check with accuracy the parallelism of the derailleur mounting portion with respect to the longitudinal center line of the frame. Also, when the interval exceeds the allowable limit, the operating member is manually operated to move toward or away from the reference member, thereby providing a simple adjustment of the parallelism.

The above and further objects and novel features of the invention will be more fully apparent from the following detailed description when the same is read in connection with the accompanying drawings.

BRIEF DESCRIPTION OF THE DRAWINGS

FIG. 1 is a sectional view of an operating member only, which constitutes an adjuster of the invention, FIG. 2 is a sectional view of a reference member only, which constitutes the same, FIG. 3 is a front view of the reference member.

DETAILED DESCRIPTION OF THE INVENTION

An adjuster of the invention basically comprises an operating member C and a reference member R.

Figure 4:
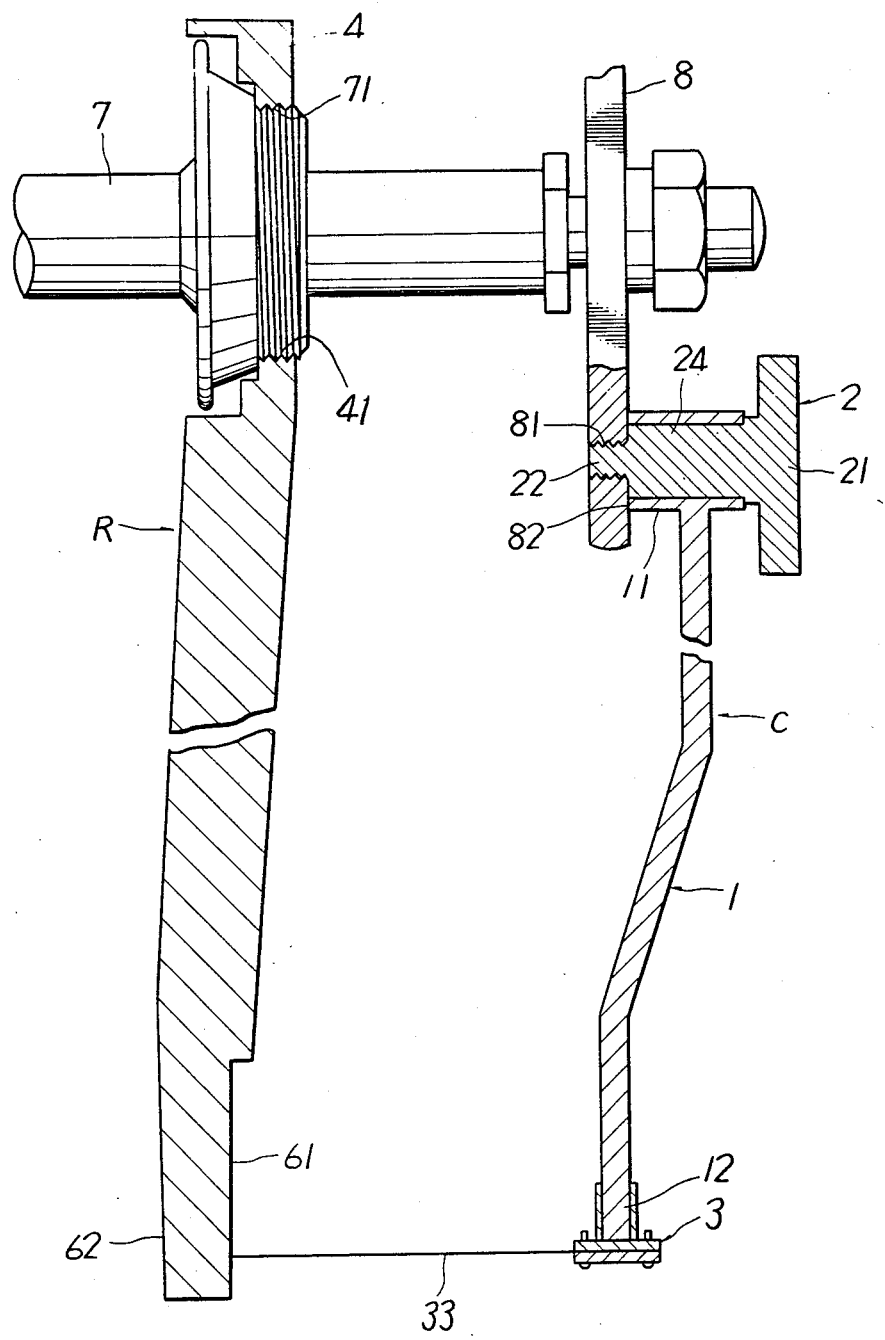
FIG. 4 is an illustration of the working condition of the adjuster of the invention.

Referring to FIG. 1, the operating member C comprises a screw member 2 screwable with a threaded bore 81 through which a rear derailleur is to be mounted on a fork end 8, as shown in FIG. 4. Operating member C also includes an operating lever 1 having at its root portion a support cylinder 11 supported rotatably to the screw member 2 and at its foremost end a measuring portion 12. The reference member R, as shown in FIGS. 2 and 3, has a mounting portion 4 screwable mainly with a threaded portion 71 provided at a rear hub 7. Reference member R extends substantially perpendicularly to the axis of the mounting portion 4, i.e., radially outwardly therefrom, and has at the utmost end of the extension reference surfaces 61 and surfaces 61 and 62 are opposite to the measuring portion 12 at the operating member C and parallel with respect to the longitudinal center line X-X' (FIG. 6) of the bicycle frame shown in FIG. 5 when the mounting portion 4 screws with the threaded portion at the rear hub 7.

In greater detail, the operating member C includes a measuring instrument 3 having a scale 33. Measuring instruments 3 is mounted on the measuring portion 12 at the operating lever 1. Screw member 2 is provided at one axial end with a threaded portion 22 screwable with the threaded bore 81 at the fork end 8, and at its other axial end with a handle 21 for manually screwing the threaded portion 22 with the threaded bore 81. Between threaded portion 22 and the handle 21 is provided a shaft portion 24 which passes rotatably through a support cylinder 11 at the operating member 1 to be discussed in detail below.

The operating lever 1 is formed of a strip-like plate or a rod and is made integral with the supporting cylinder 11 by for example, welding. Also, the operating lever 1 is slanted at its lengthwise intermediate portion such that its fore end moves toward the longitudinal center line X-X' of the bicycle frame illustrated in FIG. 6 to thereby reduce an interval between the measuring portion 12 and the reference surface 61 at the reference member R to be discussed in more detail below. Hence, the fork end is adjusted with ease and an interval between the operating member C and the reference member R can be measured with accuracy. The measuring instrument 3 mounted on the measuring portion 12 at the operating lever 1 comprises a cylinder 31 fitted on the measuring portion 12 slidably movably lengthwise thereof and a holder 32 fixed to the cylinder 31 and carrying the scale 33 slidably movably.

The scale 33 may alternatively employ, for example, a strip of a steel sheet and be wound on the holder 32 in relation of being slidably drawn out therefrom, so that, for example, a pointer provided at the holder 32 may be used to measure a length of the drawn-out scale 33.

Next, explanation will be given regarding an example of the reference member R in accordance with FIGS. 2 and 3.

The mounting portion 4 at the reference member R in FIGS. 2 and 3 is provided at its center with a threaded bore 41 screwable with a threaded portion 71 at the rear hub 7 for screwably supporting the sprockets. The reference member R is provided at its utmost end with first and second reference surfaces 61 and 62 serving as the reference for measurement of the paralla. Reference surfaces 61 and 62 are perpendicular to the axis of the threaded bore 41 at the mounting portion 4 respectively.

In addition, the reference member R is long enough to measure the reference surfaces 61 and 62 in parallel accurately to the longitudinal center line X-X' of the bicycle frame when the mounting portion 4 screws with the threaded portion 71 at the rear hub 7. Reference member R is slanted inwardly to position the second reference surface 62 on the longitudinal center line X-X' of the bicycle frame.

The proper parallelism of each reference surface 61 or 62 with respect to the longitudinal center line of the bicycle frame, when the rear hub 7 is fixed with accuracy to the fork end 8, is obtained by screwably mounting the mounting portion 4 on the rear hub 7 without any adjustment. However, the rear hub 7, when not properly perpendicular at the axis thereof to the longitudinal center line X-X', should be adjusted to be fixed to the fork end 8.

Figure 5:
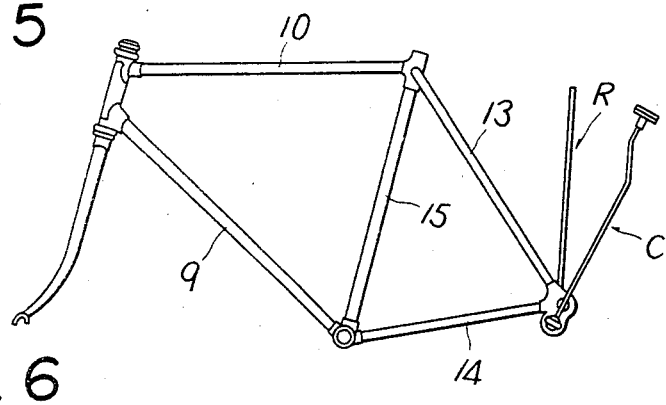
FIG. 5 is a front view of the bicycle frame on which the adjuster of the invention is mounted for adjustment.

Generally, the frame comprising a down tube 9, a top tube 10, a seat tube 15, chain stays 14 and back forks 13 as shown in FIG. 5, is assembled relatively accurately, so that the longitudinal center line X-X' of the bicycle frame, when measured on the basis of the side surface of, for example, the down tube 9, top tube 10, or seat tube 15, or on the basis of the side surface of each chain stay 14, can be checked with accuracy.

Figure 6:
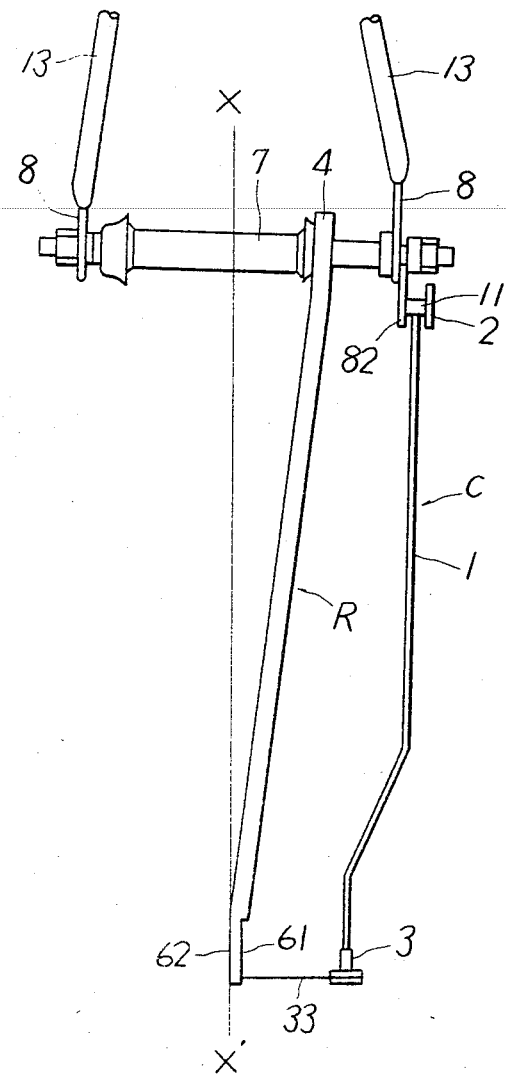
FIG. 6 is a rear view of a part of the bicycle frame.

For example, a ruler contacts with the side surface of the down tube 9, top tube 10, or seat tube 15, and is placed on the first reference surface 61 to thereby examine the relation between the ruler and the first reference surface 61. When the ruler comes into close contact with, or is parallel properly to the first reference surface 61, the first reference surface 61 is confirmed to be parallel properly to the longitudinal center line X-X' of the bicycle frame. The reference member R, when screwably mounted on the rear hub 7, is positioned between the back forks 13 and between the chain stays 14 as shown in FIG. 6, whereby a length between any point at the second reference surface 62 and the outside surface of, for example, one chain stay 14, is measured by use of a caliper or the like. When the lengths measured are constant, it is confirmed that the first reference surface 61 is parallel properly to the longitudinal center line X-X40 of the bicycle frame.

Also, in a case where the down tube 9, top tube 10, or seat tube 15, is used to measure the parallelism with respect to the longitudinal center line X-X' of the bicycle frame, a thickness or interval between the first and second reference surfaces 61 and 62 is made equal to a half of an outer diameter of each of the aforesaid tubes, so that the ruler, when the first reference surface 61 is parallel to the longitudinal center line X-X', leads to close contact with the first reference surface 61, thereby enabling the parallelism to be measured with more accuracy.

In addition, when the first reference surface 61 is not parallel to the center line X-X', the rear hub 7 is adjusted of its mounting condition to the fork end 8.

Next, explanation will be given on the case where the operating member C and reference member R constructed as abovementioned are used to measure and adjust the parallelism of the derailleur mounting portion at the fork end 8 with respect to the longitudinal center line X-X' of the bicycle frame.

At first, as shown in FIG. 4, the reference member R screws with the threaded portion at the rear hub 7, and operating member C screws at its threaded portion 22 with the threaded bore 81 at the fork end 8. Then, it is checked, on the basis of the first or second reference surface 61 or 62, whether or not the reference member R is parallel properly to the longitudinal center line X-X' of the bicycle frame.

In this case, at least two of the down tube 9, top tube 10 and seat tube 15 are selected and the ruler is used to check the parallelism, or the chain stay 14 and the caliper are used for the same purpose. If the parallelism is improper, the mounting condition of the rear hub 7 on the fork end 8 is corrected.

After the reference surface 61 and 62 thus are kept parallel with respect to the center line X-X' of the bicycle frame, the derailleur mounting portion 82 at the fork end 8 is measured of its parallelism such that the measuring portion 12 at the operating member C is positioned opposite to the first reference surface 61 and the scale 33 is pulled out, thereby measuring therewith an interval between the measuring portion 12 and the first reference surface 61.

Then, the operating member C is rotated around the screw member 2 so as to change the contact position of the support cylinder 11 at the operating lever 1 with respect to the fork end 8, whereby the aforesaid intervals, similarly to the above, are measured at a plurality of desired portions to be the mounting portion 82 for the derailleur.

In this case, the reference member R also rotates as needed so that its axial position varies, thereby defining a certain reference position for the measurement.

Thus, the measurement result at the respective measuring positions, when included in a range of a desired error, is left as it is. If the error exceeds the limit, in other words, when the derailleur mounting portion 82 is not parallel with respect to the longitudinal center line X-X' of the bicycle frame, the derailleur mounting portion 82 is adjusted of its parallelism.

In detail, a user grips the reference member R with one hand and the operating lever 1 at the operating member C with his other hand, and moves the operating lever 1 toward or away from the longitudinal center line X-X' of the bicycle frame to thereby keep the operating lever 1 within a range of allowable limit of error on the basis of the reference member R. Thus, the plurality of the aforesaid portions are adjusted to keep an accurate parallelism of the derailleur mounting portion 82 at the fork end 8 with respect to the longitudinal center line X-X' of the bicycle frame.

Thereafter, the reference member R and operating member C are removed from the rear hub 7 and fork end 8 respectively, and a rear wheel and sprocket assembly are assembled on the frame.

In addition, the measuring instrument 3 at the operating member C need not always be mounted thereon. The measuring instrument 3 preferably uses the scale 33 and may alternatively be fixed to the operating lever 1. In a case where the instrument 3 is movable, it is possible, when the wheel is mounted on the rear hub 7, to measure an interval between the wheel rim and the operating member C.

Alternatively, the reference member R may be mounted on a member at the bicycle other than the rear hub 7.

Also, the fork end 8 is provided with a support groove (not shown) for supporting the rear hub 7. In this case, the reference member R may be mounted on a threaded portion provided at a special installed member.

In addition, the the term "installed member", as used herein, is broadley defined to include the rear hub.

As is apparent from the above, the adjuster for the bicycle fork end of the invention includes the operating member C mounted on the threaded bore 81 at the derailleur mounting portion 82 and the reference member R mounted mainly on the threaded portion at the rear hub 7 for the sprockets, thereby measuring an interval between both the members C and R. Hence, the interval is measured at a plurality of portions so that the derailleur mounting portion at the fork end can be measured with accuracy of the parallelism with respect to the longitudinal center line X-X' of the bicycle frame.

Furthermore, when an error in measurement of the aforesaid interval exceeds the allowable limit, the user grips the operating lever 1 at the operating member C and the reference member R and moves the operating lever 1 toward or away from the reference member R, whereby the parallelism of the derailleur mounting portion with respect to the longitudinal center line of the bicycle frame can be adjusted with ease and accuracy.

While a preferred embodiment of the invention has been described using specific terms, such description is for illustrative purpose only, and it is to be understood that changes and variations may be made without departing from the spirit or scope of the following claims.

What is claimed is:

1. An adjuster for a bicycle frame fork end, said fork end having a support groove for supporting a rear hub and a threaded bore for mounting a derailleur, said fork end being fixed to a pair of back forks and a pair of chain stays of the bicycle frame, said adjuster comprising:
    (a) an operating member comprising a screw member screwable with said threaded bore of said fork end and an elongate operating lever including at one end a support cylinder rotatably supported to said screw member and at another end a measuring portion;
    (b) a reference member having on one end a mounting portion with a threaded bore screwable with a threaded portion of an installed member installed on said bicycle frame, said reference member extending from said mounting portion substantially perpendicular to an axis of said threaded bore of said mounting portion and having on its other end a reference surface disposed opposite to said measuring portion of said operating member substantially parallel to a longitudinal center line of said bicycle frame when said mounting portion is screwed with said threaded portion of said installed member; and
    (c) a measuring instrument for measuring a distance between said measuring portion of said operating member and said reference surface.

2. An adjuster according to claim 1, wherein said reference surface comprises a first reference surface which is level with an outer surface of a frame constituting member disposed on said center line and a second reference surface which coincides with said longitudinal center line when said mounting portion is screwed with said threaded portion of said installed member.

3. An adjuster according to claim 1, wherein said measuring instrument comprises a scale and is supported at said measuring portion of said operating member.

4. An adjuster according to claim 1, wherein said installed member is a rear hub of said bicycle frame.

* * * * *